Sept. 12, 1939.　　　　　P. SUBKOW　　　　　2,172,821
PROCESS FOR PREPARING OXIDIZED ASPHALT
Filed May 13, 1938　　　2 Sheets-Sheet 1
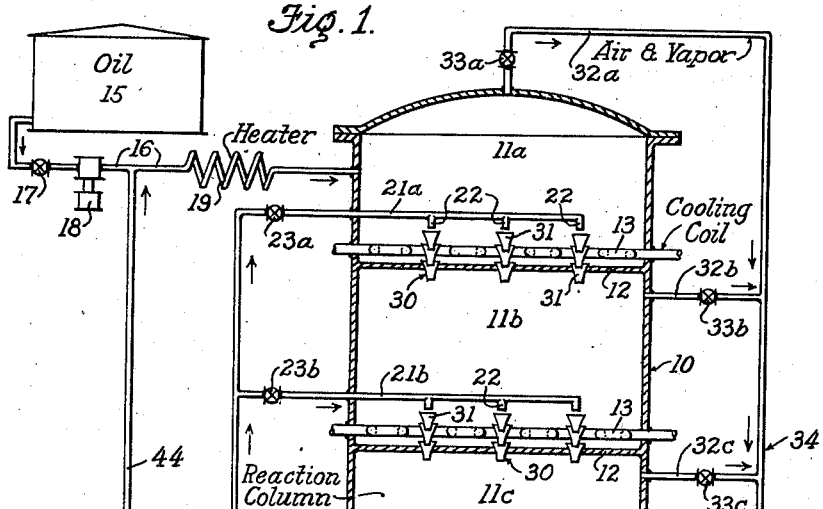
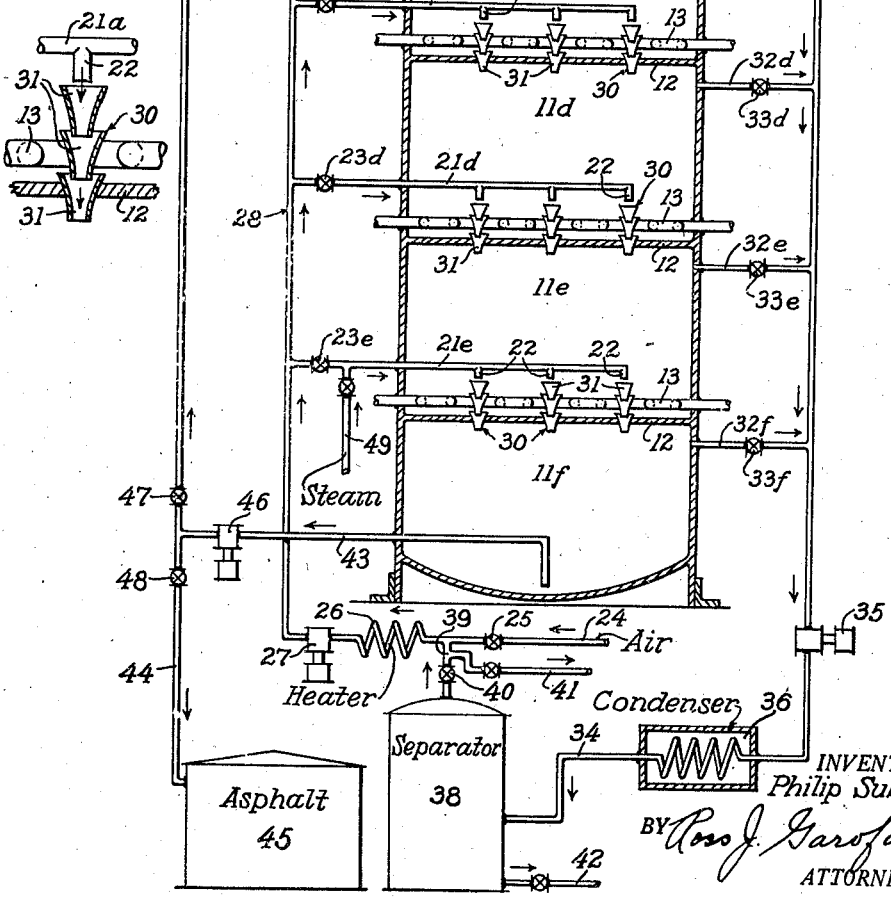
INVENTOR.
Philip Subkow
BY Ross J. Garofalo
ATTORNEY.

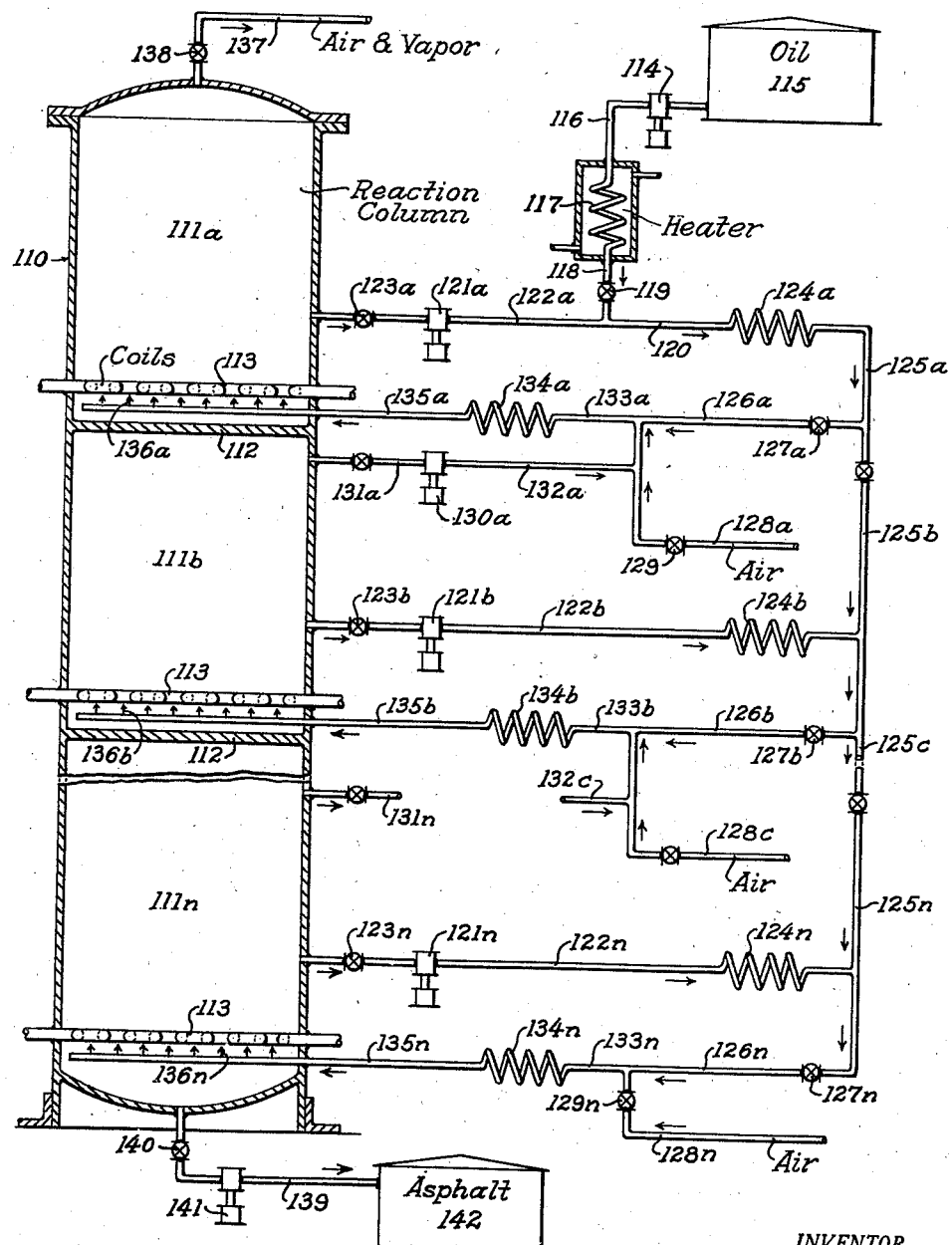

Patented Sept. 12, 1939

2,172,821

UNITED STATES PATENT OFFICE 2,172,821

PROCESS FOR PREPARING OXIDIZED ASPHALT

Philip Subkow, Los Angeles, Calif., assignor to Union Oil Company of California, Los Angeles, Calif., a corporation of California Application May 13, 1938, Serial No. 207,667

10 Claims. (Cl. 196—74)

The present invention relates to a process for treating petroleum oils. More particularly, the invention pertains to a process and apparatus for the production of oxidized or air-blown asphalts of superior grade or quality. This invention is a continuation in part of my co-pending applications Serial Numbers 735,178 and 735,179 filed July 14, 1934.

Heretofore, difficulty has been experienced in producing an asphaltic product or cement which would be entirely suitable for the manufacture of roofing compounds, paving asphalts, battery sealing products, and the like. The main objection to the asphaltic products obtained by the processes of the prior art resides in the lack of uniformity in the oxidation of the oil, part of the asphaltic product obtained being over-oxidized, and another part remaining only partially and insufficiently oxidized.

According to one of the conventional methods of producing oxidized or air-blown asphalt, air or air and steam are introduced in varying proportions into the bottom of a cylindrical still containing a charge of asphaltic oil, and the oil in the still is heated to a temperature sufficiently high to obtain the necessary oxidation reaction. This temperature may vary from 340 to 550° F. depending on the type of final product desired and the characteristics of the primary material employed. Ordinarily, the oil to be treated is initially heated to about 350° F. so that the air introduced into said oil may produce the desired oxidation reaction. This reaction is exothermic in nature, causing a gradual increase in temperature of the oil being treated. The optimum oxidizing temperature lies between 450 and 500° F. When the oil to be treated reaches this temperature, it is desirable to maintain the oil within the optimum temperature range until the completion of the oxidation reaction. Usually, this reaction is continued for 18 to 36 hours, depending upon the nature of the original stock as well as the desired characteristics of the final asphaltic product. The oxidation increases the melting point and decreases the penetration and ductility of the original stock.

Immediately following the termination of the oxidation reaction the supply of air is discontinued, and the oxidized charge is steam blown for a period of from 1 to 5 hours. This latter operation results in the removal of the light oils present in the original charge or formed during the oxidation reaction. The removal of these lighter fractions obviously raises the flash point of the oxidized asphalt, thereby improving its quality.

It is however obvious that this method of producing air-blown asphalt cannot result in a product of the highest grade. This is, at least partly, due to the fact that the air is not brought in intimate contact with the asphaltic oil, and that the air, passing through the oil in large globules or bubbles, brings only a small percentage of such air into intimate contact with the oil (thus necessitating excessive quantities of air for the amount of oxidation required), and also produces an asphalt which is partly over-oxidized and partly insufficiently oxidized.

Furthermore, when using the conventional methods of operation, it is difficult to maintain a uniform temperature for the charge being treated. Thus, the oxidizing action being exothermic in nature, the added heat results in overheating of at least a portion of the asphaltic oil to a temperature at which cracking and formation of carbonaceous materials occur. This renders the product more brittle and less ductile as compared with an asphalt produced under conditions whereby uniform oxidation could be effected.

It is therefore an object of the present invention to provide a simple, efficient and economical process and apparatus by which petroleum oils and/or fractions thereof may be converted into asphaltic products.

Another object of the invention is to control the various characteristics of penetration, melting point, ductility, etc. of an asphaltic product. A still further object of the reaction is to provide a continuous system of oxidation of oil.

It has now been discovered that the above and other objects may be realized by thoroughly and repeatedly intermixing and commingling the asphaltic oil and the oxygen-containing gas under conditions whereby the oxidation of the asphaltic oil is regulated to obtain a controlled oxidation.

It has been further discovered that the above objects may be fulfilled by providing a process and an apparatus wherein the intermingling of the oil and of the oxygen-containing gas, the rate of reaction and the temperature and degree of oxidation are regulated and controlled within the desired range.

It has also been discovered that a high grade asphalt may be obtained by oxidizing the asphaltic oil in stages under such conditions that the oxidation reaction in each stage oxidizes the oil only partially. Accordingly, the asphaltic oil or a fraction thereof is heated to the reaction temperature and thoroughly commingled with air or another oxygen-containing gas. The oxidizing reaction is regulated so that the oil is only partially oxidized. Thereafter, the partly oxidized oil is again thoroughly intermixed with additional quantities of air, and the reaction is controlled so that the oil is further oxidized. The degree of oxidation is regulated by controlling in each stage the reaction temperature, time of reaction, as well as the proportions of oil and of air. The above described reactions are repeated until the asphaltic oil has been oxidized to the desired degree, so that the asphaltic product thus produced has the desired characteristics.

It has been further found that a desired thorough commingling of the asphaltic oil or fraction thereof with the oxygen-containing gas may be obtained by jetting said gas into the oil at the point or points where it passes from one reaction zone or chamber to the next succeeding one. The oil to be treated and the oxygen-containing gas may be preheated to the incipient temperature of oxidation before their introduction into the oxidizing zones or chambers.

Therefore, the invention resides in a continuous process and in an apparatus for such process, wherein an asphaltic oil, or a fraction thereof, and an oxygen-containing gas, such as air, are first separately preheated to a desired temperature, introduced into an oxidation reaction zone, and thoroughly commingled therein by jetting the air or another gas through the oil, the temperature and duration of the reaction, as well as the proportions of the oil and air, being controlled to produce only the desired oxidation of the asphaltic oil. The invention still further resides in providing a process and apparatus wherein the above enumerated oxidation reaction is carried out in a series of stages in each of which the asphaltic oil is thoroughly commingled with an oxygen-containing gas and in which the oxidation reaction is controlled to oxidize the oil only partially, so that the asphaltic oil after passing through said series of oxidation stages is finally oxidized to the desired degree. The invention still further resides in a process and apparatus wherein the commingling of the oil and gas and the passage of the oil from stage to stage is produced by jetting the oxygen-containing gas into the oil through one or more jets installed between the stages. According to this phase of the invention, preheated air (or another oxygen-containing gas) is introduced into each reaction zone through a series of jets which latter cause the commingling of the air and oil and also force the mixture into the next succeeding reaction section, the unused portion of the gas, together with any vapors developed during the reaction, being withdrawn from each reaction zone and passed through a separator for the recovery of the vapors. This permits the use of a single continuously-acting tower consisting of a plurality of reaction zones, the oxidizing gas being used both for the oxidation of the oil and for the forcing thereof into the next succeeding reaction zone.

The invention still further resides in the countercurrent passage of the oil to be oxidized and of the oxygen-containing gas, thereby producing a substantially complete use of the oxygen. According to this phase of the invention, the oil being oxidized in a plurality of oxidizing zones or stages as described hereinabove, the oxygen-containing gas from a later stage of oxidation is utilized in part or in whole for the purpose of commingling with and oxidizing the asphaltic oil coming from a prior stage of oxidation. The countercurrent continuous operation, according to the above process, also increases the throughput and efficiency of the apparatus, as well as the proper oxidation of the primary material.

For a better understanding of the above enunciated principles of the present invention reference is now made to the drawings, Fig. 1 of which discloses schematically an embodiment of an apparatus which may be employed for the carrying out of the process constituting the subject-matter of the present invention, while Fig. 2 is an enlarged view of a jetting device described more fully hereinbelow. Figure 3 discloses schematically another embodiment of apparatus which may be employed for carrying out other embodiments of the processes constituting the subject matter of my invention.

Referring more particularly to Fig. 1, a vertical cylindrical drum 10 is divided into a plurality of reaction zones or sections 11a, 11b, 11c, 11d, 11e, and 11f, these sections being separated from each other by means of plates 12. Each of these sections is provided in its lower portion with a coil 13 which is used for cooling the interior of the section, as by means of a cooling medium, such as water or oil, circulated through said coil. However, when necessary, these coils 13 may also be used for heating the interior of the sections, in which case a heating medium such as steam, hot water or hot oil is circulated therethrough.

The uppermost section 11a communicates with an oil storage tank 15 by means of a pipe 16 provided with a valve 17, pump 18 and heating coil 19. The air or a similar oxygen-containing gas, used for the oxidation of the oil introduced into section 11a from tank 15, enters said section through pipe 21a equipped with a plurality of open-ended nipples 22 and with a valve 23a. The air is introduced into said pipe 21a from an outside source through line 24, valve 25, heater 26, pump 27 and line 28. This latter line 28 is further provided with branch lines 21b, 21c, 21d and 21e (similar to pipe 21a), which lines communicate respectively with the sections or chambers 11b, 11c, 11d and 11e, said lines being also provided within the sections or chambers with a plurality of open-ended nipples 22. These branch lines are further equipped with valves 23b, 23c, 23d and 23e, respectively.

Each of the open-ended nipples 22 is disposed over an injector 30 which latter (as more particularly shown in Fig. 2) consists of a plurality of open tapered nozzles 31 arranged in such a manner that the narrower end of the upper nozzle projects slightly into the wider end of the next succeeding lower nozzle. Such an arrangement permits the liquid surrounding said injectors 30 to flow into the nozzles. Also the jetting effect produced by the passage of air into said injector 30 from the above-mentioned nipples 22 causes a suction effect, thus drawing the liquid into the injectors through the wider portions of the nozzles 31. The lowermost nozzle of each injector 30 passes through the partition or plate 12, thus communicating adjacent reaction sections.

The uppermost reaction section 11a is further provided with an air and vapor discharge line 32a provided with a valve 33a. This line 32a opens into a pipe 34 equipped with a pump 35 and condenser 36. The upper portions of the reaction zones or sections 11b, 11c, 11d, 11e and 11f also communicate with line 34 through lines 32b, 32c, 32d, 32e and 32f, respectively, said lines being provided with valves 33b, 33c, 33d, 33e and 33f. The opposite end of pipe 34 communicates with a separator 38, the upper end of which is in communication with the air line 24 by means of pipe 39 provided with a valve 40. This pipe is equipped with a branch line 41. A valved line 42 leads away from the lower portion of said separator.

A line 43 communicates the bottom portion of the lowermost reaction zone 11f with a line 44, one end of which opens into an asphalt storage tank 45, while the other end opens into line 16 leading from the oil storage tank 15 to the uppermost section 11a. Pipe 43 is provided with a pump 46, while line 44 is equipped with valves 47 and 48.

In operation, the asphaltic oil or a fraction thereof is withdrawn from the storage tank 15 by means of pump 18 and forced through pipe 16 into the uppermost reaction section 11a. In its passage to said section the oil is first heated in 19 to the necessary temperature, said temperature being the incipient temperature of oxidation and ranging from 340° F. to upward of 450° F., depending on the character of the oil being treated, etc. Simultaneously with this continuous introduction of oil into section 11a, air is continuously forced into this section through nipples 22, said air, or a similar oxygen-containing gas, being conveyed through pipe 24, heater 26, pump 27, line 28 and pipe 21a. The rate of introduction of such air is regulated by means of pump 27 as well as by valve 23a in line 21a. The rate of introduction of such air is regulated by means of pump 27 as well as by valve 23a in line 21a. The air is passed under pressure into the injectors 30. As stated above, this passage of the air through the injectors 30 causes the oil to be drawn into the tapered nozzles 31, thus thoroughly commingling the oil and the air. The two substances being substantially at the oxidation temperature for the given oil, oxidation of the oil fraction occurs. However, the proportion of air to the oil, the duration of the reaction and the temperature thereof are regulated so that only partial oxidation occurs in the first or uppermost reaction section.

The thus partially oxidized oil, together with most of the air introduced through line 21a, then passes to the injectors 31 into the next succeeding reaction section 11b. The air remaining in the uppermost section 11a, as well as any vapors generated therein, are withdrawn through line 32.

The partially oxidized oil thus entering into section 11b drops to the bottom thereof wherein it is again thoroughly commingled with additional quantities of air entering into said section through branch line 21b by the regulation of valve 23b thereon. This air causes a further partial oxidation of the oil as well as forces it into the third reaction section 11c. As in the case of the uppermost section, the rate of oxidation is regulated by the proportion of air to oil, by the rate of reaction, and by the cooling of said section by means of cooling coil 13. The unused portion of the air remaining in section 11b is withdrawn therefrom through pipe 32b controlled by valve 33b.

In a similar manner the partially oxidized oil is successively oxidized in sections 11c, 11d and 11e by the oxygen-containing gas, such as air, introduced thereinto through lines 21c, 21d and 21e and thoroughly commingled with the oil in the various injectors 30 disposed immediately below the nipples projecting downwardly from said branch lines. Also the unused air is withdrawn from these sections through the pipes 32c, 32d, 32e and 32f and removed from the system through line 34 by means of pump 35. This air, as well as the vapors carried by it, may then be passed through a condenser 36 for the condensation of the above-mentioned vapors. The condensed vapors may then be segregated in separator 38 and withdrawn from the system through line 39 controlled by valve 40, or withdrawn from the system through branch line 41.

The oxidized oil reaching the bottom of the lowermost reaction section 11f is withdrawn therefrom through line 43 by means of pump 46. If this product is sufficiently oxidized, it is conveyed by said pump 46 to the asphalt storage tank 45 by opening valve 48 in line 44. If, however, the product is considered to be insufficiently oxidized, it may be returned into the uppermost reaction section 11a by closing valve 48 and opening valve 47, which procedure would convey said product into line 16. The asphaltic product thus produced and conveyed into tank 45 may be withdrawn therefrom while hot for purposes of steaming.

The oxidation temperatures in the various reaction sections 11a, 11b . . . 11f, may be maintained uniform, or may increase progressively from the uppermost section to the lowermost section. Thus, if the temperature of oxidation is to be the same in all of the sections, the oil withdrawn from tank 15 may be heated, as stated above, to the incipient temperature of oxidation, say 340° F., in heater 19, and then introduced into section 11a wherein it is commingled with air introduced through pipe 21a and which is also heated to the same temperature. In this reaction section, the proper temperature of oxidation is maintained by cooling coil 13. The thus partially oxidized oil then passes into the next reaction section 11b wherein it is again commingled with preheated air and wherein the same temperature of oxidation as that in the uppermost reaction section 11a is also maintained by a cooling coil 13. On the other hand, and since the oxidation of an unoxidized oil may be carried out more easily than the oxidation of a partly oxidized oil, it is sometimes preferred to increase the temperature as the oxidation progresses. In such a case, the oil may be introduced into the first reaction chamber or section at a temperature of about 340° F., and the reaction temperature in said section may be maintained by the cooling coil 13 in said section at about 360° F. The oil is then conveyed to section 11b which is maintained at a higher temperature, as for example 375° F. The next section may then be at about 400° F. Thus, the temperatures in the various sections may be at gradually increasing levels until the lowermost section may be at the optimum temperature, as for example 540° F. In like manner, the temperatures may be controlled so as to decrease from 11a to 11f by regulating the rate of cooling. In fact, the apparatus and the controls are sufficiently flexible to give any variation in temperature throughout the column.

I do not intend to limit myself to the number of reaction sections or zones shown in the drawings, but may vary said number at will. Other modifications may also be made within the spirit of my invention. Thus, instead of returning the insufficiently oxidized asphaltic product from section 11f back into the uppermost section 11a, it may, if desired, be returned to any one of the intermediate reaction zones. Also, the air introduced into the various reaction zones may be heated to various temperatures by the provision of heaters on the branch lines leading from pipe 28. Furthermore, the last or lowermost section may be used for steaming the asphaltic product. This may be accomplished by closing valve 23e in line 21e, and opening the valve in the steam line 49. Such steaming of the asphaltic product will remove the lighter fractions and produce an asphalt of a desired flash point.

A still further modification resides in the application of the present process and apparatus for the purpose of fractional steam distilling of oils. When using the present process and apparatus for such steam distillation, the crude oil or a fraction thereof is continuously fed from tank 15 by means of pump 16 into the uppermost section 11a of the still 10, steam being introduced thereinto through branch line 21a. Obviously the thorough commingling of the oil and steam produces the desired distillation and evaporation of the lighter fractions, which latter are withdrawn from the system through lines 32a and 34. The steam introduced into section 11a simultaneously conveys the remaining oil into the next section 11b wherein further distillation is accomplished by steam introduced through branch line 21b. This may be continued until the residual oil reaches the lowermost section 11f. Obviously the various overhead fractions distilled off in the different sections 11a—11f may be either withdrawn together through line 34 or may be separately conducted to individual condensers to obtain different condensed fractions.

Referring more particularly to Figure 3, 110 is a vertical cylindrical drum divided into a plurality of sections 111a, 111b ... 111n, these sections being separated from each other by means of imperforate plates 112. Each of these sections is provided with coils 113 which may be either used for cooling the interior of the sections, as by means of a cooling medium such as water or oil circulated through said coils, or for heating purposes as by circulating steam or hot oil therethrough.

An asphaltic oil or a fraction of the asphaltic oil to be oxidized is withdrawn by means of a pump 114 from a bulk storage or tank 115, and is forced through line 116, heater 117, and line 118 controlled by valve 119. The oil then passes into line 120 wherein it is commingled with the oil coming from section 111a. This oil, partially oxidized as described hereinbelow, is withdrawn from section 111a by means of a pump 121a through line 122a controlled by valve 123a, said pump 121a forcing the thus withdrawn oil into the above mentioned line 120. The mixture of partially oxidized oil and of the fresh oil from the bulk supply 115 then passes through a temperature conditioner 124a wherein the temperature of the mixture is regulated so as to prevent overoxidation in the next oxidizing stage. The oil then passes through lines 125a and 126a wherein it is thoroughly commingled with an oxygen-containing gas, such as air. This oxidizing medium may consist either of fresh air or the like introduced into line 128a controlled by valve 129a, or of the unused portion of such oxidizing gas withdrawn by means of pump 130a from the upper part of section 111b through line 131a, and forced through line 132a into the above mentioned oil mixture in line 126a. However, a mixture of the above mentioned oxygen-containing gases coming from both sources may be used for injection into line 126a. The thus obtained mixture of oil and air is then passed through line 133a, another temperature conditioner 134a (wherein the mixture is heated to the temperature necessary to cause the oxidation of the asphaltic oil), and then into line 135a. This line extends into the lower portion of section 111a and is provided with perforations 136a through which the oil-air mixture is injected into the oil contained in the lower portion of said section 111a.

It is obvious that the passage of the oil-air mixture through 133a and 135a, as well as the injection thereof through the perforations 136a into section 111a, permits a thorough contacting and commingling of the mixture thus preventing the channeling of the air through the oil. Such thorough contacting of the oil with the air, both substances being at the desired or necessary temperature, permits an oxidation of the asphaltic oil, the degree of oxidation being controlled by the cooling medium passed through the coil 113, as well as by the time during which the oil and air remain in the oxidizing chamber. The unused air and the vapor produced by the oxidation and by the rise in temperature are withdrawn from the system through line 137 controlled by valve 138. This mixture may be passed through a condenser (not shown in the drawings) for the purpose of condensing and recovering any oil fractions entrained therein. The oil fractions thus obtained may be either returned to tank 115 or used for some other purpose.

By actuating valve 127a in line 126a and the valve in line 125b, the circulation of the oil partially oxidized as described above in section 111a (with or without any new quantities of asphaltic oil coming from tank 115) may be effected through lines 125b, 126b, 133b, and 135b, and into chamber 111b. During such passage of the partially oxidized oil from chamber 111a, said oil may first be commingled in the lower portion of line 125b with the oil withdrawn from section 111b by means of pump 121b through line 122b controlled by valve 123b, and forced by said pump through a temperature conditioner 124b into said line 125b. The thus commingled oil is then passed through line 126b controlled by valve 127b, into line 133b wherein it is again thoroughly commingled with an oxygen-containing gas. As in the case of the air or gas entering into line 133a, this oxidizing medium to be introduced into line 133b may either be a fresh gas entering the system through line 128b, or it may be a partly used oxygen-containing gas withdrawn from the next lower section and introduced through line 132b.

The thus obtained intimate mixture of partly oxidized asphaltic oil and an oxygen-containing gas is again either cooled or heated at 134b (depending on whether the desired or required reaction temperature has not been attained or has been exceeded), and is then introduced through line 135b and perforations 136b into the oil in the lower portion of section 111b for further oxidation. The reaction temperature is again controlled by the heating or cooling coil 113 so that the desired further oxidation of the oil is obtained. Also, the degree of oxidation in this section 111b is regulated further by the period of time during which the oil remains in the section. When the desired degree of oxidation for said section has been reached, the thus partly oxidized oil is withdrawn from the reaction zone through line 122b as described above, while the unused gas is removed through line 131a to be used for the oxidation of the oil entering into the chamber of section 111a.

The operations of the succeeding sections are carried out in the same manner as those of sections 111a and 111b described hereinabove. Thus, by actuating the valves in lines 125b and 126b, the partly oxidized oil withdrawn from section 111b may be introduced through line 125c into the next succeeding section after it has been commingled with new quantities of oxygen-containing gas or with the unused portion of such gas coming from the second next succeeding chamber, or with gas coming from both sources. Also this oil, being thus introduced into the next reaction section for further partial oxidation, may be first commingled with the oil withdrawn from said section, as this has been described hereinabove with reference to sections $111a$ and $111b$. Furthermore, the unused portions of the oxygen-containing gas, such as air, withdrawn from the reaction sections may be used for partial oxidation of the asphaltic oils being introduced into the next preceding reaction section.

The partly oxidized oil withdrawn, as described hereinabove, from the penultimate section is passed into line $125n$ wherein it may be commingled with the partially oxidized oil withdrawn from section $111n$ by means of pump $121n$ through line $122n$ controlled by valve $123n$. Before the commingling of these two streams of oil the temperature of the partly oxidized asphaltic body thus withdrawn from section $111n$ may be increased or decreased by a passage through a temperature conditioner $124n$. The mixture of these two oils is then passed into line $126n$ controlled by valve $127n$. In this line the oil is thoroughly commingled with air or an oxygen-containing gas introduced through line $128n$, equipped with valve $129n$. The thus obtained mixture is then conducted to line $133n$, temperature conditioner $134n$, and line $135n$. Thereafter, the mixture passes through the perforations $136n$ into the substantially oxidized oil in the lower portion of section $111n$. Here further oxidation is effected, the temperature of the reaction, as in the preceding sections, being again controlled by cooling coil $113$ and by the time during which the oil remains in said section.

As stated above, the oxidizing medium which has not been used up in section $111n$ is withdrawn from the upper portion thereof through line $131n$ to be used for the oxidation of the oil passing into the penultimate section.

If the oil in section $111n$ has not been oxidized to the desired degree, it may be recycled as described hereinabove. When the desired degree of oxidation of the oil has been attained, the asphaltic product thus produced is withdrawn from the lower end of section $111n$ through line $139$ equipped with valve $140$, and is conducted by pump $141$ into an asphalt storage tank $142$. The asphaltic product thus produced may be withdrawn from tank $142$ while hot for purposes of steaming.

As is obvious from the above description of the apparatus and of its operations, the asphaltic oil or a fraction thereof may be recycled through any one of the above-mentioned sections a plurality of times until the desired oxidation for that particular section is obtained, the thus partially oxidized oil being thus conducted to the next lower oxidizing section. Of course, if the desired partial oxidation has been obtained in any one of the sections after the first passage of the oil therethrough, no recirculation is necessary, and the oil can be directly conducted successively through the remaining oxidizing sections. It is also obvious that, instead of having superimposed reaction sections, the structure may consist of a plurality of separate reaction chambers installed on the same or different levels, and connected substantially as described hereinabove.

In view of the fact that the oxidation reaction is exothermic in nature, the oil to be oxidized, as well as the oxidizing gas commingled therewith, must be preliminarily heated preferably to the incipient temperature of oxidation, such temperature, as stated above, being above 340° F. and sometimes ranging up to 550° F., depending on the character of the stock treated. Thereafter, and upon the commencement of such oxidation reaction, the additional heat generated must be controlled, as by cooling coils $113$ and the various temperature conditioners $124a$, $124b \ldots 124n$, and $134a$, $134b \ldots 134n$. Such a control of the reaction temperature prevents an over-oxidation of the oil. Also, the repeated partial oxidation of the oil, each of which oxidations is followed by a separation of the unused oxidizing gas and then by a thorough commingling of the oil with additional quantities of such oxidizing gas (or with the unused gas coming from the next succeding oxidizing section), prevents unequal oxidation of the oil, thus producing an asphaltic product having the desired uniform characteristics.

The oxidation temperatures in the various reaction sections $111a$, $111b \ldots 111n$, may be maintained uniform, or may increase progressively. Thus, if the temperature of oxidation is to be the same in all sections, the oil withdrawn from tank $115$ may be heated to the incipient temperature of oxidation, say 340° F., in heater $117$ and temperature conditioners $124a$ and $134a$, and then introduced into section $111a$ after being first commingled with air. In this reaction section, the proper temperature of oxidation is maintained by cooling coil $113$. The partially oxidized oil is then withdrawn from said section, and again cooled to the incipient temperature in conditioners $124a$ and $134b$ before introduction into the next reaction section $111b$.

On the other hand, and since the oxidation of unoxidized oil may be carried out more easily than the oxidation of partly oxidized oil, it is sometimes preferred to increase the temperature as the oxidation progresses. In such a case, the oil may be introduced into the first reaction chamber at about 340° F., and the temperature in said section may be maintained at about 360° F. From this reaction zone the oil may then be conveyed to section $111b$ which is maintained at a higher temperature, as for example 375° F. The next section may then be at about 400° F. Thus, the temperatures in the various sections may be at gradually increasing levels until the last section may be at the maximum desired temperature, as for example, 540° F.

As to the air or other oxygen-containing gas to be used for the oxidation of the asphaltic oil, the total quantity of such gas necessary for the oxidation may be introduced into the system through line $128n$, circulated countercurrently through the system, and the unused portion withdrawn therefrom through line $137$ together with any vapors formed during the oxidation reaction. In the alternative, additional quantities of the oxidizing gas may be introduced into the oil flowing to the various sections, such introduction being made through lines $128a$, $128b$, etc.

The present invention is subject to a number of variations. Thus, one of the modifications resides in the application of the present process and apparatus for purposes of fractional steam distillation of oils. When using the present process and apparatus for this purpose, the crude oil, or a fraction thereof, is continuously forced from tank 115, by means of pump 114, into lines 120, 125a and 126a. In this latter, the oil is thoroughly commingled with steam. The steam, as in the case of the use of the column for oil oxidation, may come either from an outside source or from the next lower section 111b. Partial distillation occurs in section 111a, the oil being conveyed from section to section for further distillation. All of the steam may be introduced through line 128n, this steam thus passing countercurrent to the downward movement of the oil and scrubbing the latter of any entrained light fractions. Obviously, all of the steam, together with the evaporated fractions may be withdrawn from the system through line 137. On the other hand, fractions or cuts may be withdrawn from individual sections, or groups thereof, to obtain various petroleum distillates.

This invention is not limited by any theory of its mechanism nor by any details which have been given merely for purposes of illustration, but is limited only in and by the following claims in which it is desired to claim all novelty inherent in the invention.

I claim:

1. A process of blowing asphalt-producing petroleum base materials, comprising, introducing a stream of material to be treated at an elevation into a reaction chamber, separating the stream into pools, said pools having a gravity downward flow, injecting separate currents of an oxidizing gas at selected elevations into the reaction chamber, withdrawing the residual gases from the reaction chamber, withdrawing the oxidized petroleum base material from the reaction chamber and recirculating at least a portion thereof through the reaction chamber.

2. A process of blowing asphalt-producing petroleum base materials comprising, introducing a stream of material to be treated at an elevation into a reaction chamber, separating the stream into pools, said pools having a gravity downward flow, injecting separate currents of an oxidizing gas at selected elevations into the reaction chamber, withdrawing the residual gases from the reaction chamber, recirculating at least a portion thereof to said chamber and withdrawing the oxidized petroleum base material from the reaction chamber.

3. A process of blowing asphalt-producing petroleum base materials comprising, introducing a stream of material to be treated at an elevation into a reaction chamber, separating the stream into pools, said pools having a gravity downward flow, injecting separate currents of an oxidizing gas at selected elevations into the reaction chamber, withdrawing the residual gases from the reaction chamber and recirculating at least a portion thereof to said chamber, withdrawing the oxidized petroleum base material from the reaction chamber and recirculating at least a portion thereof to the reaction chamber.

4. A continuous process of producing blown asphalt which consists in preheating a stream of asphalt-producing petroleum base material, causing a gravity flow of said stream in a reaction chamber in such manner as to separate the stream into pools, introducing for contact with said material currents of an oxidizing gas at different elevations with respect to the downward moving column of the material under treatment, continuously withdrawing the oxidized petroleum base material from the reaction chamber, adjusting the heat content of at least a portion of the withdrawn oxidized petroleum base material and recirculating it to the reaction chamber.

5. In the process of claim 4, the step of adjusting the heat content of the oxidized asphalt-producing material withdrawn from the reaction chamber by commingling it with fresh petroleum base material before returning it to the reaction chamber.

6. A process of producing blown asphalt which comprises introducing a stream of asphalt producing petroleum base material at an elevation into a reaction chamber, causing a gravity flow of said stream in said reaction chamber in such a manner as to separate the stream into pools, introducing for contact with said material currents of an oxidizing gas at different elevations with respect to the downward moving column of the material under treatment, withdrawing oxidized petroleum base material from the reaction chamber, commingling at least a portion thereof with fresh petroleum base material and returning the mixture to the reaction chamber.

7. A method for oxidizing oil which comprises commingling oil with oxygen-containing gas and introducing said mixture into a first oxidation stage to partially oxidize said oil, withdrawing said partially oxidized oil from said first oxidation stage, cooling said partially oxidized oil to a temperature above the incipient oxidation temperature, commingling said cooled partially oxidized oil with oxygen-containing gas, cooling said mixture to a temperature above the incipient oxidation temperature and introducing said cooled mixture into a second oxidation stage to cause further partial oxidation of said oil, separating unused oxygen-containing gas from said partially oxidized oil in said second oxidation stage and employing said separated oxygen-containing gas for said first mentioned commingling with oil.

8. A method for oxidizing oil which comprises commingling oil with oxygen-containing gas, introducing said mixture into a first oxidation stage to partially oxidize said oil, withdrawing said partially oxidized oil from said first oxidation stage, commingling said withdrawn oil with oxygen-containing gas, cooling said mixture of partially oxidized oil and oxygen-containing gas to a temperature above the incipient oxidation temperature, introducing said cooled mixture into a second oxidation stage to further oxidize said oil, separating unused oxygen-containing gas from said second oxidation stage and employing said separated oxygen-containing gas for said first mentioned commingling with oil.

9. A method for oxidizing oil which comprises commingling oil with oxygen-containing gas, cooling said mixture to a temperature above the incipient oxidation temperature and introducing said cooled mixture into a first oxidation stage to partially oxidize said oil, withdrawing said partially oxidized oil from said first oxidation stage, commingling said withdrawn oil with oxygen-containing gas, cooling said mixture of partially oxidized oil and oxygen-containing gas to a temperature below the incipient oxidation temperature and introducing said cooled mixture into a second oxidation stage to further oxidize said oil, separating unused oxygen-containing gas from said second oxidation stage and employing said separated oxygen-containing gas for said first mentioned commingling with oil.

10. A method according to claim 9 in which said second mentioned cooling is to a higher temperature than said first mentioned cooling.

PHILIP SUBKOW.